United States Patent [19]

Martino

[11] Patent Number: 4,964,240
[45] Date of Patent: Oct. 23, 1990

[54] PISTON RING GRINDER

[76] Inventor: Philip C. Martino, 110 Larchwood Drive, Turtle Creek, Pa.

[21] Appl. No.: 209,468

[22] Filed: Jun. 21, 1988

[51] Int. Cl.$^5$ ............................................. B24B 41/06
[52] U.S. Cl. .................. 51/125.5; 51/216 R; 51/290; 269/57; 269/303
[58] Field of Search ............... 51/98.5, 125, 125.5, 51/216 R, 216 T, 216 ND, 216 H, 217 R, 290; 29/156.62, 76.1; 269/57, 71, 240, 249, 303

[56] References Cited

U.S. PATENT DOCUMENTS

| | | | |
|---|---|---|---|
| 1,459,117 | 6/1923 | Seifert | 29/156.62 |
| 1,513,073 | 10/1924 | Thurston | 29/76.1 |
| 1,522,123 | 1/1925 | Higgins | 51/217 R |
| 1,540,765 | 6/1925 | Daniels | 29/156.62 |
| 1,543,611 | 6/1925 | Olson | 29/156.62 |
| 1,750,195 | 3/1930 | Sanders | 51/125 |
| 1,916,783 | 7/1933 | Daniels | 51/125 |
| 1,946,881 | 2/1934 | Porter | 409/64 |
| 2,013,262 | 9/1935 | Wilsey | 51/125 |
| 2,487,670 | 11/1949 | Pezous | 51/125 |

FOREIGN PATENT DOCUMENTS 1344586 10/1987 U.S.S.R. ............................. 51/290

Primary Examiner—Frederick R. Schmidt
Assistant Examiner—Blynn Shideler
Attorney, Agent, or Firm—Walter J. Blenko, Jr.; Suzanne Kikel

[57] ABSTRACT

A piston ring grinding apparatus providing piston rings of consistent gap is disclosed. The piston ring grinding apparatus has a base member with a piston ring grinding means mounted thereon. The piston ring holder is rotatably mounted on the base member for movement of a piston ring mounted thereon into and out of contact with the grinding means. A gauge means are in operative association with the piston ring holder and are mounted on the base member in a position to gauge rotational movement of the piston ring holder.

22 Claims, 3 Drawing Sheets

PISTON RING GRINDER

This application relates to a piston ring grinder which accurately grinds piston rings to a predetermined or desired gap.

It is desirable to provide piston rings with consistent gaps. Traditionally this has been done by manually grinding the rings, and attempting to maintain an accurate gap distance by visual inspection. Alternatively, the ring may be compressed and inserted in the cylinder bore and the gap determined by use of feeler gauges. Several devices are known that disclose a holder for a piston ring and a grinder or cutter for grinding and/or cutting the ends of the ring at the split. See, for example, U.S. Pat. Nos. 1,916,783; 2,013,262; 2,487,670; 1,946,881; 1,522,123, and 1,513,073.

I provide an apparatus for grinding the end surfaces of piston rings to obtain a desired gap in the ring when it is inserted into a cylinder. I provide a base member and a piston ring holder and grinding means mounted on the base member. I further provide a piston ring holder which is rotatably mounted on the base member for movement of the end of a piston ring mounted thereon into and out of contact with a grinding surface. Additionally I provide gauge means in operative association with the piston ring holder and mounted on the base member in a position to gauge rotational and tangetial movement of the piston ring. I further preferably provide a motor mounted on the base member by means of a bracket and which has a shaft that extends from the bracket. I provide a grinding surface secured to the end of the shaft. I provide a cup slidably mounted on the base member. I prefer to mount the cup in a slotted area in the base. I further provide a turntable mounted on and rotatable within the cup which has an indicator bearing surface bracket located generally above the surface of the turntable.

In the accompanying drawings, I have illustrated a present preferred embodiment of my invention in which.

Figure 1:
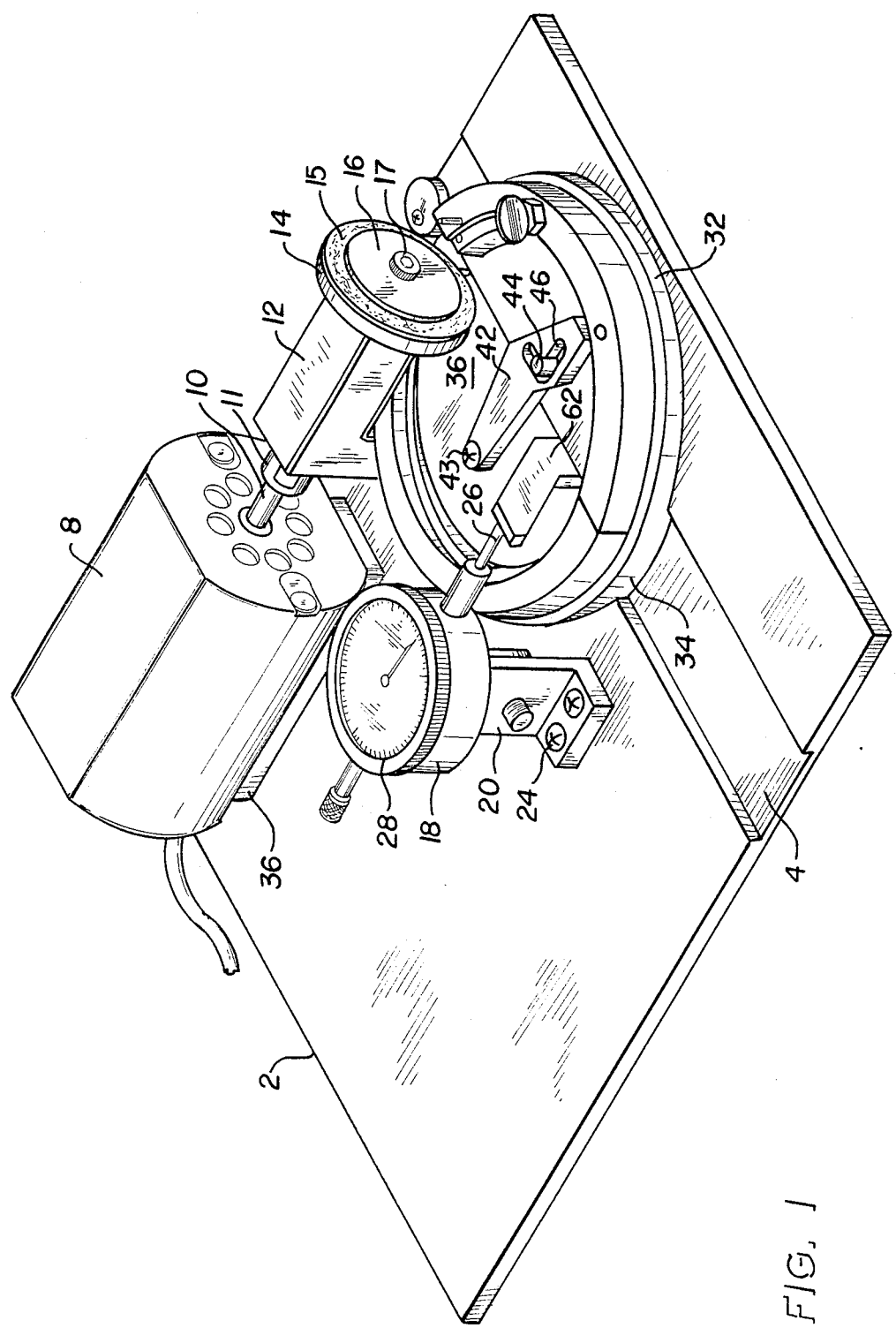
FIG. 1 is an isometric view of a piston ring grinder embodying the present invention.
Figure 2:
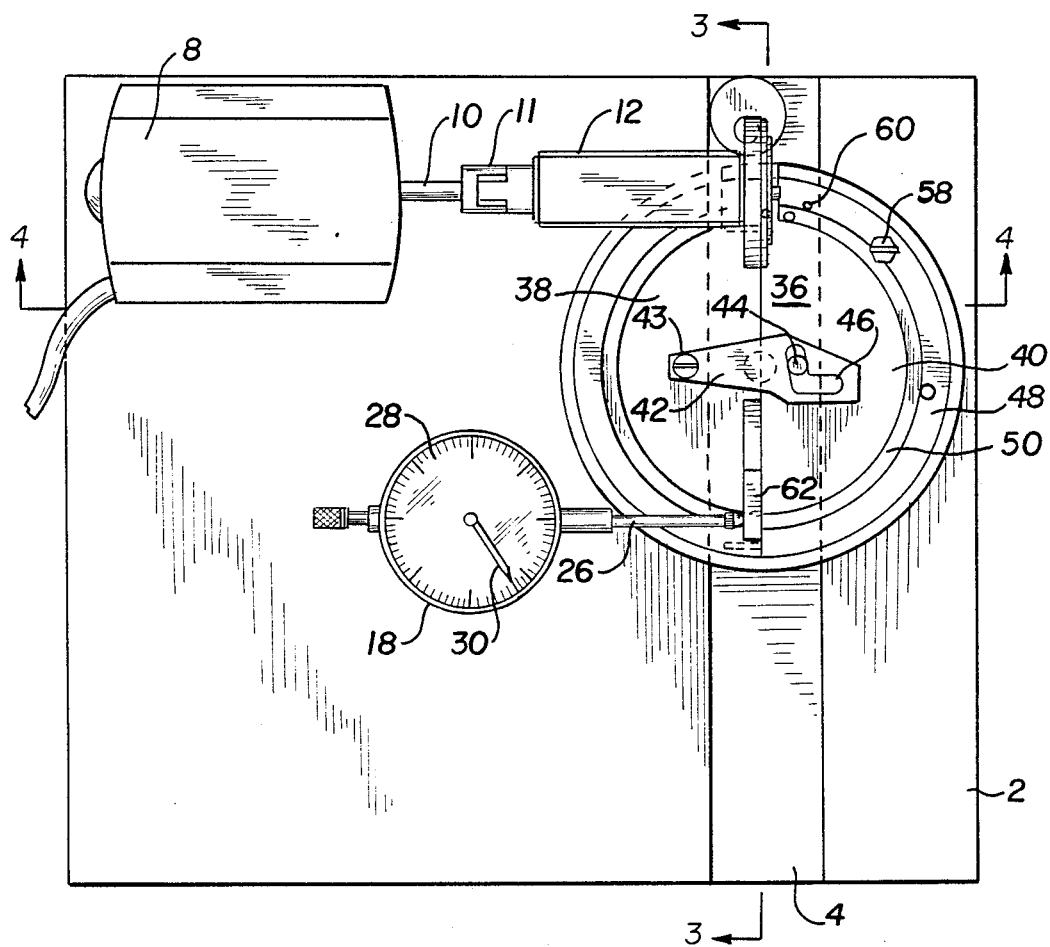
FIG. 2 is a top plan view of the apparatus shown in FIG. 1.
Figure 3:
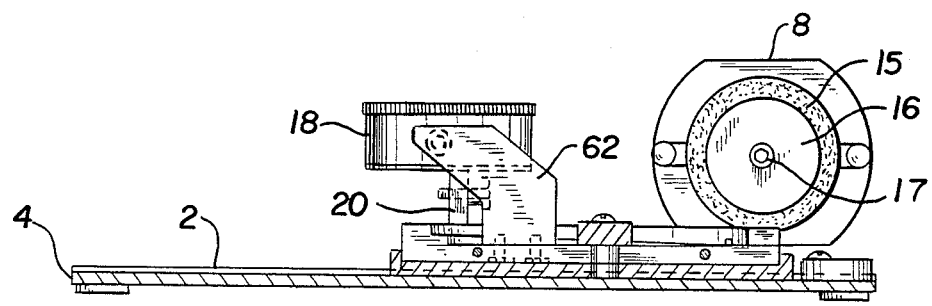
FIG. 3 is an end elevational view of the apparatus shown in FIG. 2 taken along line III—III of FIG. 2.

The piston ring grinder is mounted on a base 2. Base 2 contains a slotted groove 4, which extends across the base between opposite sides. A bracket 36 is mounted on the base 2 adjacent one edge. A motor 8 is mounted on bracket 36 and bracket 36 is secured to base 2. The motor 8 has a shaft 10 which extends from the motor 8. An extension 13 of shaft 10 including a coupling 11 is journaled in a grinding disc bracket 12 which is mounted on base 2. A grinding wheel 14 is mounted on a shoulder end of shaft extension 13 projecting from bracket 12. An abrasive paper 15 is clamped to the end face of grinding disc 14 by a washer 16. Disc 14, abrasive paper 15, and washer 16 are clamped against the shoulder on shaft extension by a set screw 17.

A dial indicator 18 is mounted to the base 2 by a bracket 20. The bracket has screws 24 which fasten the bracket 20 into position on the base 2. The dial indicator 18 has a shaft 26 which extends from the dial indicator 18 generally parallel to the motor 8. Shaft 26 is located directly above a piston ring being ground. The dial indicator 18 has indicia 28 which indicate run-out. The dial indicator pointer 30 may be used to position or locate the desired gap distance. A movable index may be positioned on the case of the indicator to provide a zero or set point.

A cup 32 is disposed over and within the slotted groove 4. The cup 32 has an extension 34 that is generally the same size as the slotted groove 4. The cup 32 may travel from one end to the other end of the slotted groove 4. A turntable 36 is placed within the cup. The turntable 36 is rotatable within the cup 32.

Figure 5:
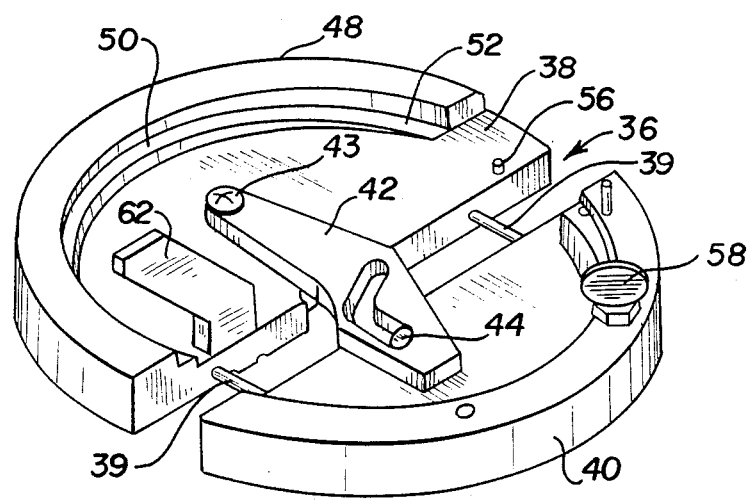
FIG. 5 is an isometric view of the turntable employed in the present invention.

The turntable 36 is composed of two semi-circular halves, 38 and 40. The halves may be moved together and apart. As shown in FIG. 5, pins 39 extend from bores in turntable sections 38 and 40 and maintain the two halves of the turntable 36 in alignment. Once brought together, the first half 38 and second half 40 may be locked into position by means of a lock 42 which is pivotally mounted on turntable half 38 by a pivot pin 43. Specifically, the lock 42 has a pin 44 mounted on turntable half 40 that engages and interlocks with a slot 46 which has a right angle configuration. The pin 44 is interlocked with the slot means 46 in order to lock the first half 38 and the second half 40 of the turntable 36 into juxtaposition.

The turntable 36 has an outer rim 48 which prevents the piston ring from expanding outwardly beyond the limits of the turntable 36. Inside the perimeter of the rim 48 of the turntable is a ramp 50.

Figure 4:
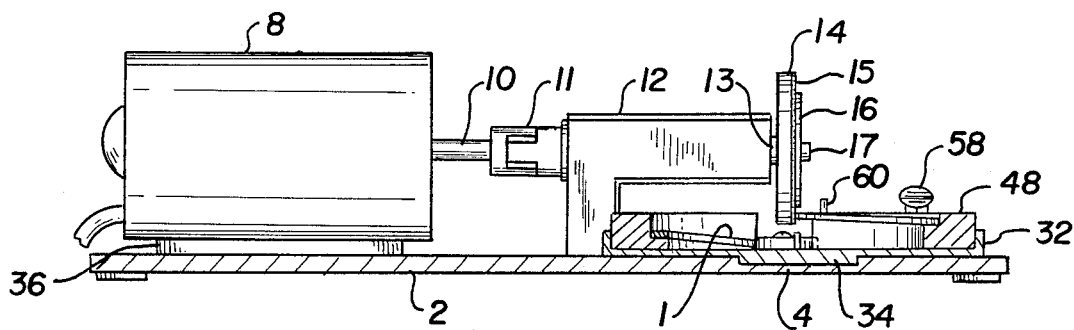
FIG. 4 is a side elevational view of the apparatus shown in FIG. 3 taken along line IV-IV of FIG. 2.

As best shown in FIG. 4, the ramp has a lower end 52 and an elevated end 54. The difference in the height between the lower end 52 and the elevated end 54 of the ramp 50, is at least as great as the vertical dimension of the piston ring 1. An indexing pin 56 fixes the lateral position of the piston ring 1, when placed in the turntable 36.

A clamp 58 is located on the rim 48 and locks the piston ring 1 into position once the piston ring is placed on the ramp 50. A stop pin 60 is disposed on the rim 48 of the turntable 36. The stop pin 60 limits outward movement of the upper end of a piston ring position on ramp 50. An indicator operating bracket 62 is disposed on the lower surface 64 of the turntable 36, and extends upwardly above the surface of the ramp 50 and rim 48. The shaft 26 extending from the indicator is contacts the indicator operating bracket when the bracket 48 is disposed in front of the dial indicating means 52.

In operation, a piston ring 1 (FIG. 4) is placed onto ramp 50 of the turntable 36. The end of the piston ring at the lower end 52 of ramp 50 is rotated until the end is placed against the indexing pin 56. The piston ring 1 extends around ramp 50 and beyond the edge of the elevated end 54 of ramp 50. The stop pin 60 extends vertically and restrains piston ring 1 from outward radial movement. After the piston ring is placed on ramp 50, turntable halves 38 and 40 are pushed together and locked into position by rotating lock 42 on pivot pin 42. Clamp 58 is turned down to secure the piston ring firmly into position on ramp 50. The turntable 36 is then placed into the cup 32. The cup 32, with turntable 36, is then placed into the slot 4. The cup 32, with turntable 36 unit is moved laterally along the slot 4 and the turntable is moved rotationally so that the indicator bearing surface bracket 62 is disposed in front of the shaft 26 of the dial indicating means 18. One end of the piston ring is against the grinding surface 15.

The amount of metal which is to be removed from one end of the ring to obtain the correct gap is determined. An index on the rim of the dial indicator may then be placed that distance from the pointer 30. Accordingly, when the desired amount of metal has been removed, the pointer will point to the index. The motor 8 is activated which drives the shaft 10 and the grinding surface 15 to grind the end of the piston ring to produce the desired gap distance. As the motor is operating, the dial indicator shaft 26 is extended as material is removed from the end of the piston ring 1. This extension is indicated by the pointer 30. The turntable 36 is slowly rotated within the cup 32 advancing the end of the ring. When the dial indicator shows the desired amount has been removed, the motor is stopped and the piston ring removed.

The turntable 36 is sized for one particular piston ring diameter. A different turntable 36 may be substituted in the cup 32 for piston rings of different diameters. Once the position is set on the dial indicator 18, any number of piston rings may be ground to the same predetermined gap distance.

While I have illustrated and described certain present embodiments of the invention it is to be understood that the invention is not limited thereto and may be otherwise variously practiced within the following claims.

I claim:

1. A piston ring grinding apparatus comprising:
   a base member having slot means,
   piston ring grinding means mounted on the base member,
   a piston ring holder which is at least rotatably mounted on the base member for movement of a piston ring mounted thereon into and out of contact with the grinding means, and comprising a cup and turntable, and
   gauge means mounted on the base member for gauging rotational movement of the piston ring holder, said gauge means being in operable engagement with the piston ring holder, and having means connected to said operable means for indexing a desired amount of material to be removed from the piston ring and for indicating the actual amount of material being removed from the piston ring upon the rotational movement of the piston ring holder,
   said cup being slidable within said base member, and said turntable being mountable and rotatable within said cup.

2. The apparatus of claim 1 wherein said turntable is split in two halves which may be separated and brought together in a linear direction.

3. The apparatus of claim 2, including a rim means disposed about the outer perimeter of said turntable for restraining outward expansion of said piston ring.

4. The apparatus of claim 3, including ramp means being disposed inside of said rim for lifting one end of said ring relative to the other end to allow said one end to be grinded by said grinding means.

5. The apparatus of claim 4, including locking means mounted on said two halves of said turntable for interconnecting said two halves and having interlocking pin means and slot means for receiving said pin means for locking said two halves of said turntable into position.

6. The apparatus of claim 5, including a piston ring indexing pin mounted on said turntable for fixing the lateral position of said piston ring.

7. The apparatus of claim 6, including clamp means mounted on said turntable for clamping said piston ring into position on said ramp means.

8. The apparatus of claim 7, including a stop means disposed on said rim for fixing the upward position of said piston ring.

9. The apparatus of claim 8, including a gauge means having a bearing surface bracket disposed generally about the surface of said turntable.

10. The apparatus of claim 9, including the means of said gauge means being in operable engagement being a shaft operatively associated with said indicating mans and extending therefrom such that said bracket may be in contacting association with the end of said shaft.

11. The apparatus of claim 10, including stop means for holding said cup and said turntable into position.

12. The apparatus of claim 11, wherein the difference in the height of said ramp is at least as great as the vertical dimension of said piston ring.

13. A piston ring grinding apparatus comprising:
    a base member;
    piston ring grinding means mounted on the base member;
    a piston ring holder which is at least rotatably mounted on the base member for movement of a piston ring mounted thereon into and out of contact with the grinding means;
    gauge means mounted on the base member to gauge rotational movement of the piston ring holder, said gauge means being in operative engagement with the piston ring holder,
    slot means disposed in said base member,
    a motor secured to said base member and operatively associated with said piston ring grinding means,
    said piston ring holder comprising a cup and turntable, with said cup being slidable within said base, and said turntable being mountable and rotatably within said cup,
    said turntable being split in two halves which may be separated and brought together,
    rim means disposed about the outer perimeter of said turntable for restraining outward expansion of said piston ring,
    ramp means being disposed inside of said rim for lifting one end of said ring relative to the other end to allow said one end of said piston ring to be ground by said grinding means, and
    locking means mounted on said two halves of said turntable for interconnecting said two halves and having interlocking pin means and slot means for receiving said pin means for locking said two halves of said turntable into position.

14. The apparatus of claim 13, including a piston ring indexing pin mounted on said turntable for fixing the lateral position of said piston ring.

15. The apparatus of claim 14, including clamp means mounted on said turntable for clamping said piston ring into position on said ramp means.

16. The apparatus of claim 5, including a stop means disposed on said rim for fixing the upward position of said piston ring.

17. The apparatus of claim 16, including a gauge means bearing surface bracket disposed generally about the surface of said turntable.

18. The apparatus of claim 17, including gauge means having a shaft operatively associated therewith and extending therefrom such that said bracket may be in contacting association with the end of said shaft.

19. The apparatus of claim 18, including stop means mounted on said turntable for holding said cup and said turntable into position.

20. The apparatus of claim 19, wherein the difference in the height of said ramp is at least as great as the vertical dimension of said piston ring.

21. A piston ring grinding apparatus comprising:

a base member;

piston ring grinding means mounted on the base member, a piston ring holder which is at least rotatably mounted on the base member for movement of a piston ring mounted thereon into and out of contact with the grinding means, gauge means mounted on the base member to gauge rotational movement of the piston ring holder, said gauge means being in operative engagement with the piston ring holder, slot means disposed in said base member, a motor secured to said base member and operatively associated with said piston ring grinding means, said piston ring holder comprising a cup and turntable, with said cup being slidable within said base, and said turntable being mountable and rotatable within said cup, said turntable being split in two halves which may be separated and brought together, rim means disposed about the outer perimeter of said turntable for restraining outward expansion of said piston ring, ramp means being disposed inside of said rim for lifting one end of said ring relative to the other end to allow aid one end of said piston ring to be grinded by said grinding means.

22. A piston ring grinding apparatus comprising:

a base member, piston ring grinding means mounted on the base member, a piston ring holder which is at least rotatably mounted on the base member for movement of a piston ring mounted thereon into and out of contact with the grinding means;

ramp means being disposed inside of said piston ring holder for lifting one end of said ring relative to the other end to offset said one end in a vertical direction to allow said one end to be grinded by said grinding means.

* * * * *

UNITED STATES PATENT AND TRADEMARK OFFICE
CERTIFICATE OF CORRECTION

PATENT NO. : 4,964,240

DATED : October 23, 1990

INVENTOR(S) : Philip C. Martino

It is certified that error appears in the above-identified patent and that said Letters Patent is hereby corrected as shown below:

Column 4, line 12, "mans" should be --means--; line 37, "rotatably" should be --rotatable--.

Column 6, line 10, "aid" should be --said--.

Signed and Sealed this

Fifth Day of May, 1992

*Attest:*

DOUGLAS B. COMER

*Attesting Officer*     Acting Commissioner of Patents and Trademarks